July 14, 1931.  P. D. HARVEY  1,814,311
MARINE REDUCTION REVERSE GEAR UNIT
Filed Oct. 31, 1927
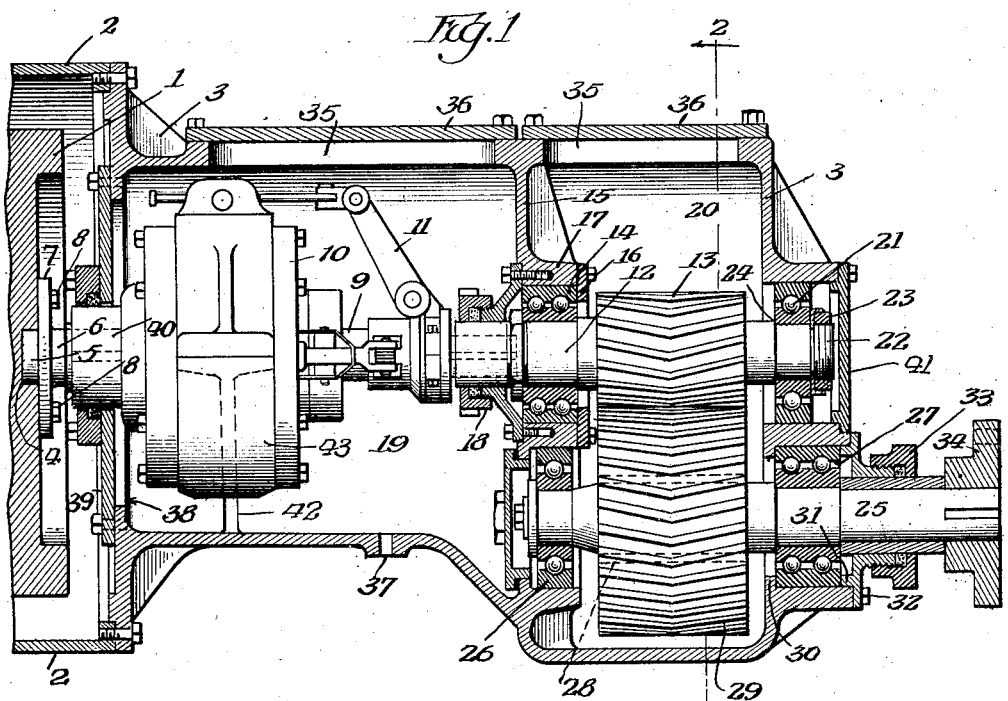
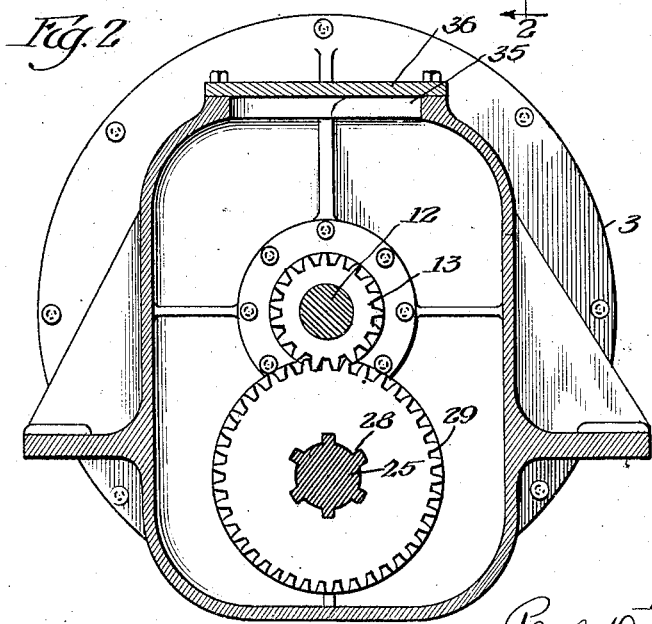
Inventor
Paul D. Harvey
By Wm. O. Bell, Atty.

Patented July 14, 1931

1,814,311

UNITED STATES PATENT OFFICE

PAUL D. HARVEY, OF CHICAGO, ILLINOIS

MARINE REDUCTION REVERSE GEAR UNIT

Application filed October 31, 1927. Serial No. 229,892.

This invention relates to marine reduction reverse gear units for gasoline engines and its primary object is to provide novel and compact driving means arranged within a unitary casing which may be detachably connected to any S. A. E. gasoline engine bell housing and which will drive a propeller at a low speed from a relatively small high speed engine and still produce the same power to the propeller shaft as would be obtained from a relatively large low speed engine.

Another object is to provide novel driving means which will reduce slippage of the propeller, prevent churning, and thereby increase the power by slowing down the R. P. M. of the propeller shaft.

Another object is to provide improved means for driving a propeller from the fly wheel end of a marine engine to reduce the torsional strain on the crank shaft, which will be more economical in operation, which can be readily and economically manufactured, and which can be easily and quickly applied to any type of S. A. E. engine bell housing.

In the accompanying drawings illustrating a selected embodiment of the invention the views are as follows:

Fig. 1 is a vertical sectional view of my unit applied to a standard S. A. E. bell housing.

Fig. 2 is a transverse sectional view taken on the line 2—2 of Fig. 1.

Referring to the drawings 1 designates an engine fly wheel suitably arranged within an S. A. E. bell housing 2 to which the casing 3 is detachably connected.

The fly wheel 1 is recessed at 4 to receive the end 5 of the stub shaft 6. A collar 7 is splined on the stub shaft 6 and fastened to the engine fly wheel 1 by means of suitable bolts 8. A driven shaft 9 is suitably supported in the casing 3 and is operatively connected to the stub shaft 6 and it carries planetary reverse mechanism 10 which is operated by a clutch arm 11.

A main gear shaft 12 is operatively connected to the driven shaft 9 and carries a herring bone gear 13. The inner end of the main gear shaft 12 is supported in bearings 14 mounted in the casing division wall 15. These bearings are held in position by a collar 16 which is fastened to an annular flange 17 integral with the division wall 15 and takes up the lateral thrust of the main gear shaft 12. A packing gland nut 18 is arranged about the main gear shaft 12, Fig. 1, to form a tight connection between the compartment 19 and the compartment 20 within the casing.

The outer end of the main gear shaft 12 is supported in suitable bearings 21 in the end of the casing and is threaded at 22 to receive the lock nut 23. These bearings are free to move laterally between the nut 23, which limits the movement of the bearings in one direction, and the shoulder 24, on the main gear shaft 12, which limits the movement of the bearings in the other direction.

A counter shaft 25 is mounted in suitable bearings 26 and 27 in the division wall 15 and the casing end wall and is splined between the bearings at 28, Fig. 2. A driven herring bone gear 29 floats on the splined portion of the shaft 25 and meshes with the driving gear 13. The bearing 27 is confined between the annular flange 30 and the packing gland 31 and takes up the end thrust of the counter shaft 25. The packing gland 31 is suitably fixed to the casing 3 by bolts 32 and is threaded at its outer end to receive the cap 33. A propeller shaft driving flange 34 is suitably keyed to the counter shaft 25 to which the propeller shaft flange (not shown) is connected.

The casing 3 has an opening 35 provided in the top thereof so that parts of the driving mechanism may be inserted therethrough. Suitable covers 36, 36 are attached to the top of the casing to seal the same. An opening 37 may be provided in the bottom of the casing to allow the oil to be drained therefrom. The opening 37 is sealed in any convenient manner such as by a plug, not shown.

The casing has an opening 38 at its inner end so that the planetary mechanism and the main gear shaft and its cooperating mechanism may be inserted in the casing as a single unit. A removable end plate 39 is fastened to the casing to seal the casing and to form a suitable bearing for the hub 40 of the planetary reverse gear mechanism.

A removable plate 41 may be provided at the outer end of the casing to allow ready access to the bearings 21.

In assembling the mechanism in the casing, the driven gear 29 is inserted through the top of the casing and allowed to rest in the bottom of the compartment 20. The planetary mechanism and the main gear shaft with the bearings 14 and 21 in position thereon are inserted through the opening 38 as a complete unit to occupy the position shown in Fig. 1; the planetary gear mechanism being supported by oppositely disposed flanges 42 integrally formed on the inside of the casing until the end plate 39 is bolted in place. The driven gear 29 is then lifted into meshing position with the driving gear 13 and held in place by means of straps, or otherwise. The counter shaft 25 is then slipped through the casing from the rear end thereof and inserted through the driven gear 29 and into the bearings 26 previously inserted. The packing gland 31 is then bolted in place, the cap 33 is secured to the gland, and the mechanism is properly positioned in the casing. The casing containing all the mechanism is then bolted to the engine bell housing which is a simple operation as the shaft 6 is splined and is readily received within the hub 40 of the planetary mechanism.

The flanges 42 also act as stops to prevent the hand 43 from turning during the reverse operation of the planetary gear mechanism.

From the above it is apparent that I have provided a compact and unitary structure suitably arranged within a single casing which may be readily applied to any standard S. A. E. bell housing. The complete unit is light in weight and when applied to a small engine will render the same performance as an engine twice its size and power without employing the use of my reduction gear unit. The casing is made in one piece, is light in weight and is a distinct departure from the conventional two-piece casing ordinarily used.

Changes may be made in the form, construction and arrangement of the parts without departing from the spirit or sacrificing any of the advantages of the invention, and I reserve the right to make all such changes as fairly fall within the scope of the following claims:

I claim:

1. In a marine reduction reverse gear unit, a one-piece housing having an integral dividing wall defining two compartments and having openings in the walls of each compartment for accessibility to the interior thereof, one of the end walls of said housing and said dividing wall having aligned openings therein, bearings in said openings, a driven shaft journaled in said bearings and extending across one compartment and into the other compartment, a herring bone gear fixed on the portion of said shaft extending across said compartment, said dividing wall and said end wall having other aligned openings therein, bearings in said openings, a counter-shaft journaled in said bearings and extending across the compartment adjacent the end wall and parallel with the first shaft and out through said bearing to extend beyond said end wall, said shaft having a splined portion thereon, another herring bone gear meshed with said first-named herring bone gear and mounted on the splined portion of said shaft, the intermeshing of said herring bone gear preventing axial movement of said other herring bone gear on said splined portion, a reverse unit including a shaft connected to the end of said driven shaft extended into said other compartment, a packing gland arranged about said driven shaft in the compartment containing said reverse unit, a plate for closing the opening in said end wall having the bearing therein in which said driven shaft is journaled, a plate for closing the opening in said dividing wall in which a bearing for said counter-shaft is journaled, and a packing gland on said end wall about said shaft extending beyond said end wall.

2. In a marine reduction reverse gear unit, a housing including an end wall and a dividing wall defining a compartment therebetween and having an opening in a wall intermediate said dividing wall and said end wall affording access into the compartment, said dividing wall and end wall having aligned openings therein, bearings in said openings, a driven shaft journaled in a pair of said bearings, a herring bone gear fixed on said shaft intermediate said bearings, a counter-shaft journaled in another pair of said bearings and having a splined portion thereon intermediate said bearings, another herring bone gear introduced into said compartment through said opening in the wall intermediate said end wall and dividing wall and having a splined bore therein whereby said counter-shaft may be slid in through the bearing in the end wall therefor to permit the splined portion thereon to be passed through said splined bore after said other herring bone gear has been meshed with the herring bone gear on said driven shaft, and means for preventing axial movement of said counter-shaft after interconnection thereof with said other herring bone gear.

3. A marine reduction reverse gear unit comprising a one-piece housing having a dividing wall and an end wall integral therewith, a removable end wall at the other end of said housing, said removable end wall having an opening therein through which a driving shaft may be extended, means preventing leakage past said driving shaft, a planetary reverse unit connected to said driving shaft and arranged in said housing on one side of said dividing wall, said dividing wall and said integral end wall having aligned openings therein, bearings in said openings, a driven shaft journaled in said bearings and extending across the compartment intermediate said dividing and integral end wall, means connecting said driven shaft to the output end of said reverse unit, a herring bone gear on said driven shaft intermediate said bearings, means for preventing leakage of lubricant past said bearings, said dividing wall and integral end wall having other aligned openings therein, bearings in said openings, a counter-shaft journaled in said bearings and having another herring bone gear mounted thereon and meshed with said first-named herring bone gear, said counter-shaft extending out of said casing beyond said integral end wall, a packing gland about said counter-shaft exteriorly of said end wall, and means preventing leakage past the bearing for said counter-shaft in said dividing wall.

PAUL D. HARVEY.